B. W. KADEL.
CAR TRUCK.
APPLICATION FILED JAN. 28, 1921.
1,414,957. Patented May 2, 1922.
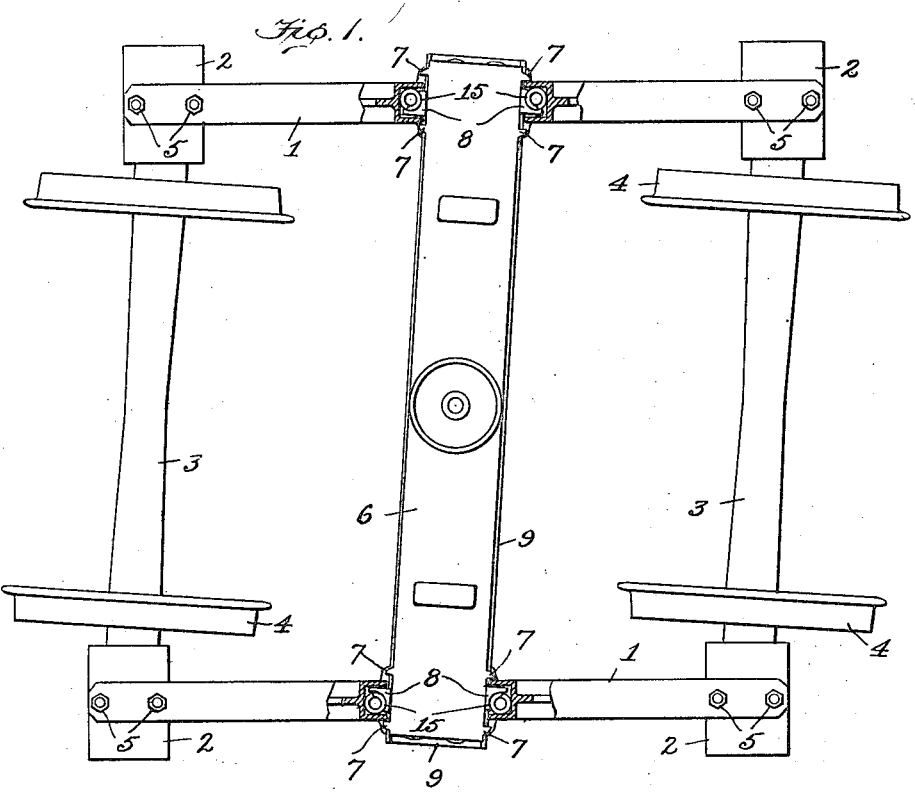
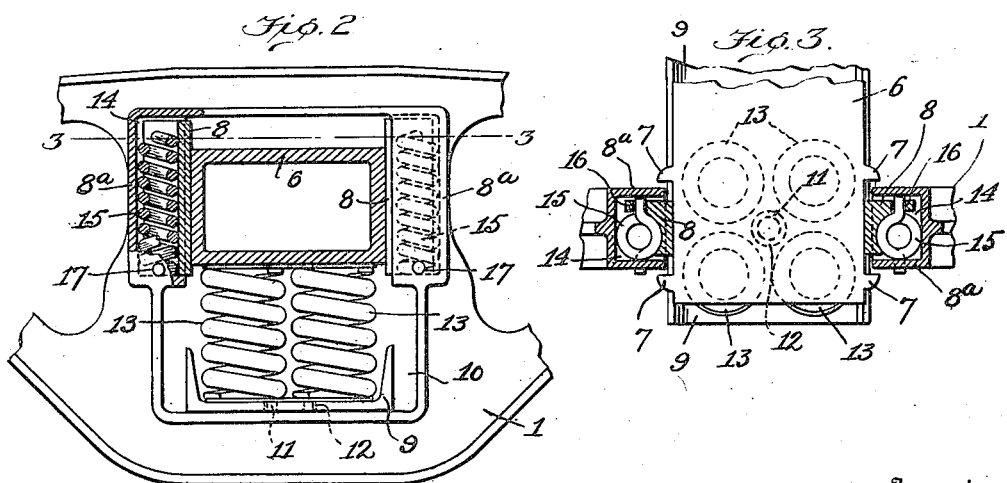
Witness
Edwin L. Bradford
Inventor
Byron W. Kadel
By Ernest F. Mechlin
his Attorney

UNITED STATES PATENT OFFICE.

BYERS W. KADEL, OF BALTIMORE, MARYLAND, ASSIGNOR TO THE T. H. SYMINGTON COMPANY, OF NEW YORK, N. Y., A CORPORATION OF DELAWARE.

CAR TRUCK.

1,414,957.  Specification of Letters Patent.  Patented May 2, 1922.

Application filed January 28, 1921. Serial No. 440,593.

*To all whom it may concern:*

Be it known that I, BYERS W. KADEL, a citizen of the United States, residing at Baltimore, in the State of Maryland, have invented certain new and useful Improvements in Car Trucks; and I do hereby declare the following to be a full, clear, and exact description of the invention, such as will enable others skilled in the art to which it appertains to make and use the same.

My invention relates to flexible car trucks and is particularly concerned with the production of an improved form of flexible truck in which means are provided for yieldingly resisting relative displacement of the side frame members longitudinally of the truck and for restoring the truck parts to normal or square relation.

The principal object of the invention is to provide a truck structure of the character indicated in which the means for yieldingly controlling the relative longitudinal movements of the side frames is well adapted for cooperation with the truck bolster. A further object of the invention is to provide simple and compactly arranged devices constituting the means for yieldingly resisting longitudinal displacement of the side frames and for restoring them to normal position. A further object is to produce a flexible truck structure in which the means for controlling the movements of the side frames are well suited for use with frame members which are cast as an integral unit.

The primary feature of the invention by which the foregoing objects are accomplished consists in providing each of the truck side frames with two part bolster guide columns and in operatively interposing between cooperating guide column parts spring means which are adapted to be energized upon a relative longitudinal displacement of the side frame members from normal position.

There are other features of the invention relating to elements of construction and to particular combinations of elements, all as will hereinafter appear.

In the drawings illustrating the preferred form in which I contemplate applying the principle of my invention, the scope whereof is pointed out in the claims:—

Figure 1 is a view, partly in plan and partly in horizontal section, of a car truck embodying the invention, the parts being in a relation such as they occupy when the truck is passing around a curve.

Figure 2 is a detail view, partly in elevation and partly in vertical section, of the central portion of one of the side frame members and the parts associated therewith.

Figure 3 is a detail sectional view on the line 3—3, Fig. 2.

In the drawings, 1 indicates the side frame members which with the exception of the movable members of the bolster guide columns, are preferably cast integral. Each of the side frame members is furnished at its opposite ends with journal boxes 2 receiving the journal ends of axles 3 upon which the truck wheels 4 are mounted. If, as illustrated in the drawings, the journal boxes are not made integral with the side frames they may be secured to the latter by means of journal box bolts 5 in a well known manner.

6 indicates the truck bolster which is adapted to move vertically and to angle horizontally with respect to the side frames of the truck. To maintain the bolster in proper operative relation to the side frames 1, said bolster is preferably provided on each side at its opposite ends with lugs or guide blocks 7 between each pair of which one of the movable bolster guide members 8 extends. The lugs 7 are spaced apart sufficiently so that, as illustrated in Fig. 1, they allow the bolster freely to angle horizontally as the side frames 1 execute relative longitudinal movements.

While the bolster 6 forms a means for connecting the side frames across the truck, it is also preferred to connect said side frames by means of a spring plank 9 whose opposite ends project into the bolster openings 10 of the side frames and rest upon the latter. The spring plank may be conveniently attached to the side frame members by providing each of the latter at the center of its bolster opening with an upwardly extending pivot boss 11 which enters a correspondingly formed opening 12 in the neighboring end of the spring plank. Suitable springs, such as 13, are interposed between the bolster 6 and the spring plank 9 for yieldingly supporting the bolster against downward vertical movement.

Each bolster guide column of the side frames 1 comprises a rigid portion 8$^a$ and a cooperating movable portion 8, the latter being adapted to engage the sides of the bolster 6 and to turn with respect to the rigid parts 8$^a$ of the guide columns conformably to the horizontal angular movements of the bolster. The rigid portions 8$^a$ of the columns are preferably recessed, as at 14, to receive the movable guide members 8, sufficient clearance being allowed between them transversely of the truck to permit the movable parts 8 to turn through the requisite angle. Housed within the respective recesses 14 on opposite sides of the bolster are vertically extending coil springs 15. One end of each of these springs is rigidly secured to the adjacent movable column 8 while its other end is similarly attached to the neighboring rigid column member 8$^a$, such construction permitting the springs 15 to be torsionally energized when the movable guide column members 8 are turned or rotated by the horizontal angular movement of the bolster 6. A convenient mode of securing the springs to the guide column members 8 and 8$^a$ is to provide said members with recesses 16 and 17, respectively, and to bend the ends of the springs so that they extend into said recesses.

In assembling the truck structure the springs 15 are inserted in the guide column recesses 14 of the side frames 1 and the lower ends of the springs are entered in the openings 17. The upper ends of the torsional springs 13 are then pulled out of the recesses 14 and entered in the apertures 16 of the respective guide column members 8, the latter being drawn to assembled position in the recesses 14 upon the springs being relieved of strain. The bolster 6 is then inserted within the lower portions of the bolster openings 10 and is moved upwardly between the bolster guide columns, after which the spring plank 9 and the bolster springs 13 are put in place.

When the side frame members 1 are displaced longitudinally of the truck from normal position the bolster 6 executes a horizontal turning or angular movement. This movement of the bolster causes a corresponding rotation of each of the movable bolster column guide members 8, thereby resulting in the several springs 15 being torsionally energized. Upon the cessation of the force effecting the out of square displacement of the side frame members 1, the energy stored in the springs 15 reacting through the bolster 6 returns the side frames 1 to normal or square position.

I claim:—

1. In a car truck, the combination with side frame members which are relatively movable longitudinally of the truck, of means for connecting said side frame members, said means being adapted to have a pivotal movement with reference to said side frame members, and vertically extending yielding means carried by said side frame members for resisting a longitudinal displacement of the latter from normal position.

2. In a car truck, the combination with side frame members which are relatively movable longitudinally of the truck, of means for connecting said side frame members, and vertically arranged coil spring means located at the side of said connecting means and operable against the side frame members for resisting a longitudinal displacement of either side frame member from normal position.

3. In a car truck, the combination with side frame members which are relatively movable longitudinally of the truck, of transversely extending means for connecting said side frame members, and torsional spring means carried by at least one of said side frame members and arranged on opposite sides of said connecting means for resisting a relative longitudinal displacement of said frame members from normal position.

4. In a car truck, the combination with side frame members which are relatively movable longitudinally of the truck, of means for connecting said side frame members, and torsional spring means mounted on at least one of said side frame members and arranged on opposite sides of said connecting means for resisting longitudinal displacement of either side frame member from normal position.

5. In a car truck, the combination with side frame members which are relatively movable longitudinally of the truck, and which are provided with bolster guide column members having openings therein, of means for connecting said side frame members, and torsional springs located in said openings, said springs being adapted to resist a longitudinal displacement of one of said side frame members from normal position.

6. In a car truck, the combination with side frame members which are relatively movable longitudinally of the truck and which are furnished with two part bolster guide columns, of a bolster adapted to have its opposite ends positioned between the said columns of each side frame member, and yielding means interposed between the parts of said bolster guide columns and adapted to be energized by a longitudinal displacement of either side frame member from normal position.

7. In a car truck, the combination with side frame members which are relatively movable longitudinally of the truck, and which are furnished with rigidly connected bolster guide column members each of which is provided with a recess therein, of a bolster adapted to extend between the said guide columns of each side frame member, and upright spring means located in said recesses for yieldingly opposing relative longitudinal movement of said side frame members from normal position.

8. In a car truck, the combination with side frame members which are relatively movable longitudinally of the truck, of means for movably connecting said side frame members across the truck, and torsional spring means carried by one of said side frame members and arranged on opposite sides of said connecting means, said spring means being adapted to be energized by a relative longitudinal displacement of said side frame members from normal position and also being adapted to return said frame members to normal position after the same have been displaced therefrom.

9. In a car truck, the combination with side frame members which are relatively movable longitudinally of the truck, of a vertically movable bolster which is adapted to angle horizontally with respect to said frame members, vertically arranged bolster springs operatively interposed between said bolster and the respective side frame members for yieldingly supporting said bolster against downward vertical movement, and vertically arranged coil springs disposed on opposite sides of said bolster and adapted yieldingly to resist relative longitudinal displacement of said side frame members from normal position.

In testimony whereof I affix my signature.

BYERS W. KADEL.